US011343076B2

(12) United States Patent
Reisinger et al.

(10) Patent No.: US 11,343,076 B2
(45) Date of Patent: May 24, 2022

(54) METHOD AND APPARATUS FOR DETERMINING A PROPAGATION DELAY AND/OR A DISTANCE BETWEEN MULTIPLE TRANSCEIVERS, PARTICULARLY FOR A VEHICLE-ENTRY AND/OR STARTING SYSTEM

(71) Applicant: Continental Automotive GmbH, Hannover (DE)

(72) Inventors: Thomas Reisinger, Regenstauf (DE); Ulrich Emmerling, Kelheim (DE); Maximilian Treindl, Wenzenbach (DE); Ewald Altmann, Regensburg (DE); Stefan Haller, Wenzenbach (DE); Franz Plattner, Arnschwang (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 696 days.

(21) Appl. No.: 16/323,923

(22) PCT Filed: Aug. 1, 2017

(86) PCT No.: PCT/EP2017/069432
§ 371 (c)(1),
(2) Date: Feb. 7, 2019

(87) PCT Pub. No.: WO2018/036761
PCT Pub. Date: Mar. 1, 2018

(65) Prior Publication Data
US 2021/0243015 A1    Aug. 5, 2021

(30) Foreign Application Priority Data
Aug. 24, 2016  (DE) .................... 10 2016 215 934.8

(51) Int. Cl.
*B60R 25/24* (2013.01)
*H04L 9/08* (2006.01)

(52) U.S. Cl.
CPC ............ *H04L 9/0819* (2013.01); *B60R 25/24* (2013.01); *B60R 2325/10* (2013.01); *H04L 2209/84* (2013.01)

(58) Field of Classification Search
CPC ... B60R 2325/10; B60R 25/24; B60R 16/037; B60R 2325/101; B60R 2325/108;
(Continued)

(56) References Cited

U.S. PATENT DOCUMENTS 6,353,776 B1    3/2002  Röhrl et al.
2013/0332736 A1*  12/2013  Kawamura ........... H04L 9/3271
                                                  713/171
(Continued)

FOREIGN PATENT DOCUMENTS

DE    19941428 A1    6/2000
DE    19957557 A1    6/2001
(Continued)

OTHER PUBLICATIONS

Korean Office Action for Korean Application No. 10-2019-7008270, dated Feb. 25, 2021, with translation, 14 pages.
(Continued)

*Primary Examiner* — Dionne Pendleton
(74) *Attorney, Agent, or Firm* — RatnerPrestia

(57) ABSTRACT

A method and apparatus for determining a propagation delay and/or a distance between a plurality of transceivers, in particular between transceivers outside and/or as part of a motor vehicle, wherein the transceivers are each designed: to generate identical codes in a plurality of these transceivers, using a calculation method known to them, from at least one starting value transmitted, in particular, from one of the
(Continued)

transceivers to the further transceivers, to transmit one or more messages from at least one of the transceivers to one or more further ones of the transceivers, which messages each contain at least one of the codes, to determine at least one propagation delay and/or at least one distance between at least two of the transceivers, in particular from the propagation delay and/or transmission times of the one or more messages.

24 Claims, 15 Drawing Sheets

(58) Field of Classification Search
CPC ... B60R 2325/205; B60R 25/00; B60R 25/04; B60R 25/20; B60R 25/246; B60R 25/30; H04L 2209/84; H04L 9/0819; H04L 9/3234; H04L 9/3273; H04L 9/0869; H04L 2209/80; H04L 63/0428; H04L 63/061; H04L 63/1466; H04L 9/0816; H04L 9/0894; H04L 9/3271; H04W 12/06; H04W 12/50; H04W 12/122; G07C 9/00309; G07C 5/008; G07C 2009/00349; G07C 2009/00412; G07C 2009/00492; G07C 2009/00555; G07C 2009/00793; G07C 2209/08; G07C 2209/63; G07C 9/00; G07C 9/00571; G07C 9/00817; G07C 9/21; H04M 1/72412
See application file for complete search history.

(56) References Cited

U.S. PATENT DOCUMENTS

| 2014/0285319 | A1* | 9/2014 | Khan | B60R 25/00 340/5.61 |
| 2014/0330449 | A1 | 11/2014 | Oman et al. | |
| 2016/0200291 | A1* | 7/2016 | Kim | H04W 12/06 701/2 |
| 2017/0263062 | A1* | 9/2017 | Bergerhoff | G07C 9/00309 |

FOREIGN PATENT DOCUMENTS

| DE | 10310157 | A1 | 9/2004 |
| DE | 102005046172 | A1 | 4/2007 |
| DE | 102012201385 | A1 | 8/2013 |
| DE | 102013021219 | A1 | 6/2015 |
| EP | 1069265 | A2 | 1/2001 |
| KR | 101011148 | B1 | 1/2011 |
| KR | 101101293 | B1 | 1/2012 |

OTHER PUBLICATIONS

German Examination Report for German Application No. 10 2016 215 934.8, dated May 24, 2017—7 pages.
International Search Report and Written Opinion for Application No. PCT/EP2017/069432, dated Nov. 15, 2017—7 pages.
Korean Notice of Allowance for Korean Application No. 10-2019-7008270, dated Aug. 13, 2021 with translation, 3 pages.

* cited by examiner

FIG 10

| MAC Header (MHR) | | | | | | MAC Useful load | MAC Footer MFR |
|---|---|---|---|---|---|---|---|
| Frame control | Sequence number | Destination PAN identifier | Destination address | Source PAN identifier | Source address | Aux security header | Frame Useful load | PCS |
| 2 octets | 1 octet | 0 or 2 octets | 0, 2 or 3 octets | 0 or 2 octets | 0, 2 or 3 octets | 0, 5, 6, 10 or 14 octets | Variable number of octets | 2 octets |

Msg-1

A; AN

| ID | Length (octets) | Type | Mnemonic | Description |
|---|---|---|---|---|
| 0x01 | 8 | RW | EUI | Extended unique identifier - the 64-bit IEEE device address |

Mem1

A; AN

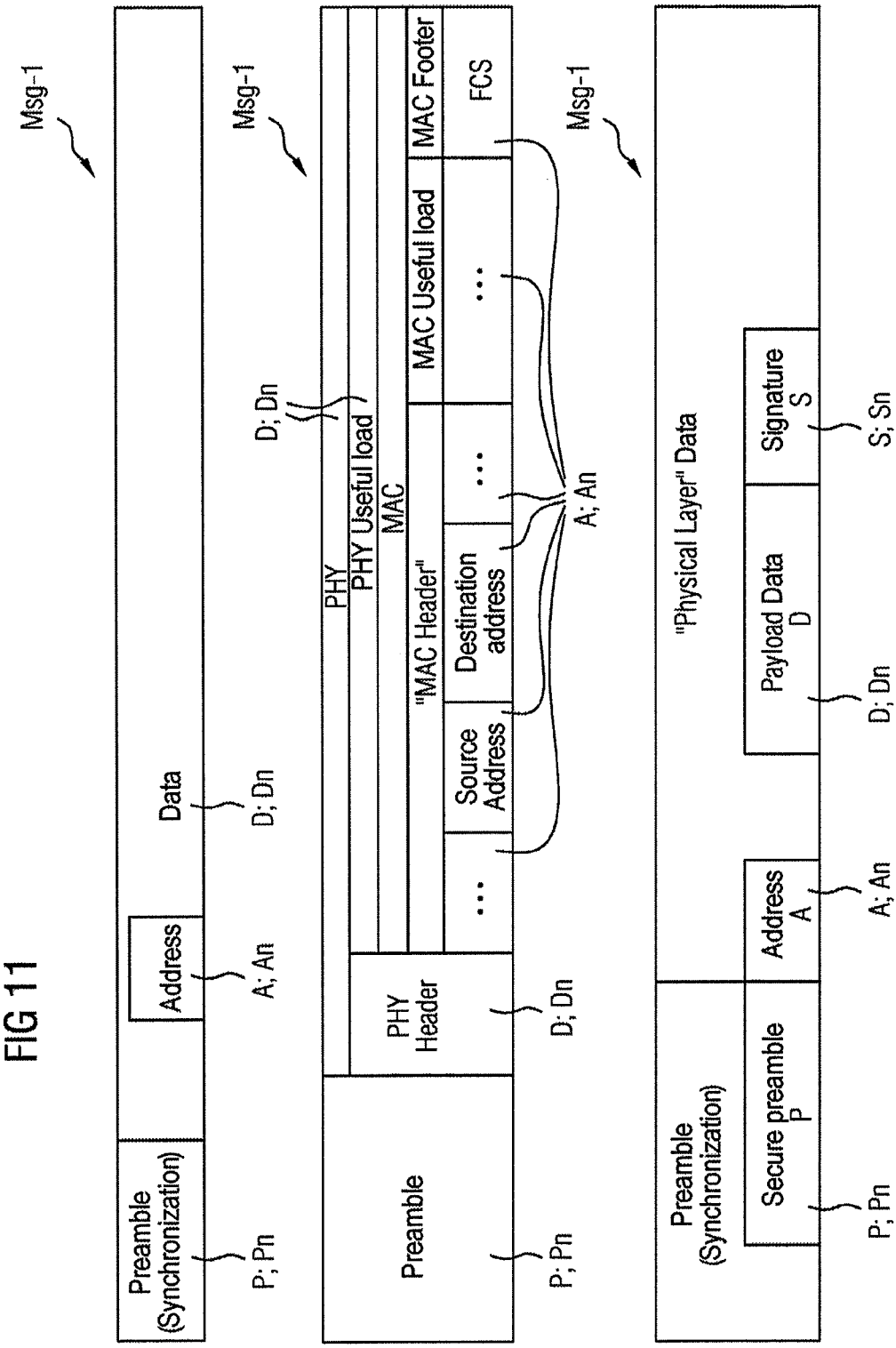

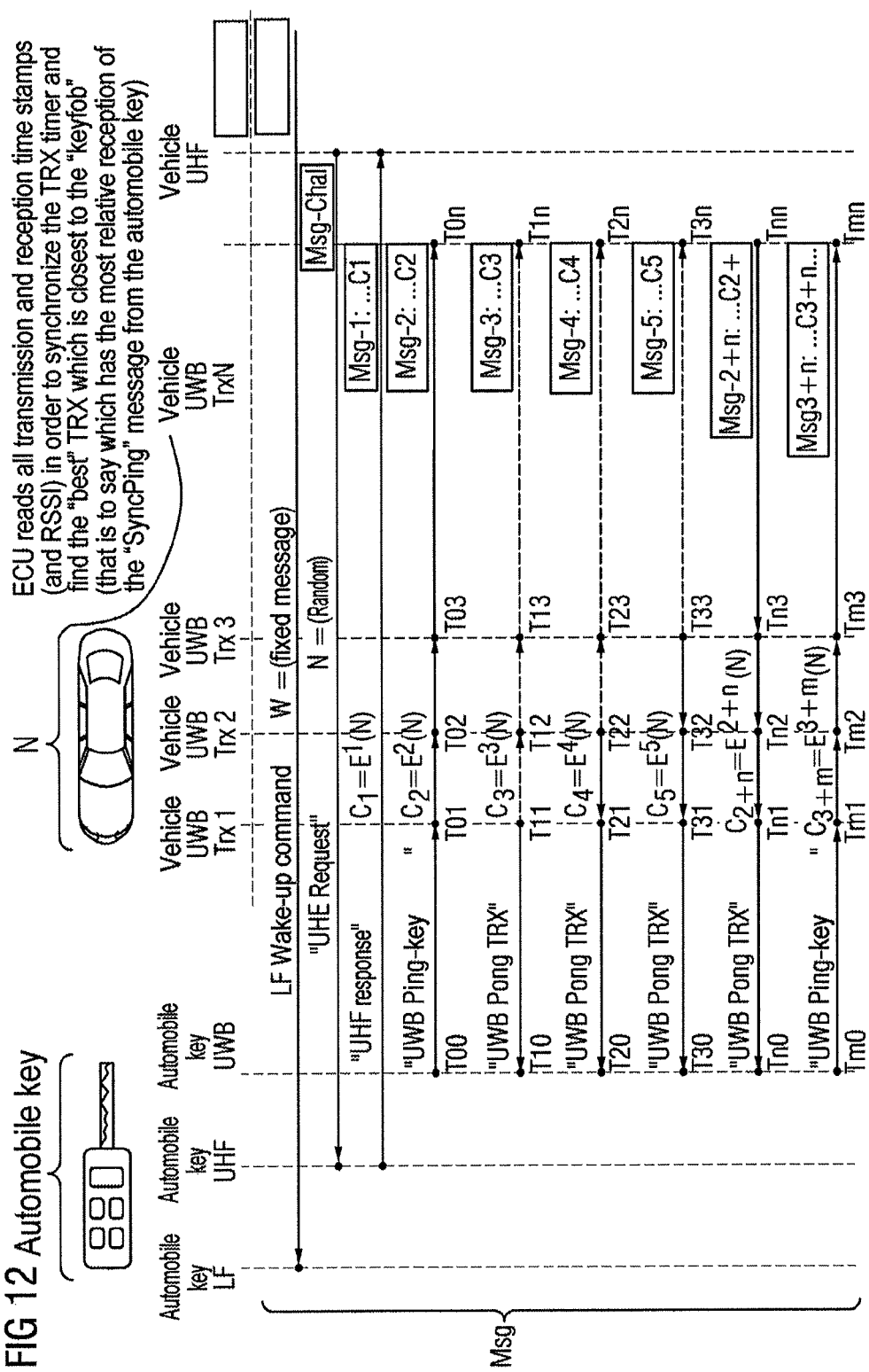
FIG 12 Automobile key

FIG 14

| Message | Sender | Recipient |
|---|---|---|
| 1 | Automobile key | TRx1, TRx2, TRx3, TRx4 |
| 2 | TRx1 | Automobile key, TRx2, TRx3, TRx4 |
| 3 | TRx2 | Automobile key, TRx1, TRx3, TRx4 |
| 4 | TRx3 | Automobile key, TRx1, TRx2, TRx4 |
| 5 | TRx4 | Automobile key, TRx1, TRx2, TRx3 |
| 6 | Automobile key | TRx1, TRx2, TRx3, TRx4 |
| 7 | TRx1 | TRx2, TRx3, TRx4 |
| 8 | TRx2 | TRx1, TRx3, TRx4 |
| 9 | TRx3 | TRx1, TRx2, TRx4 |
| 10 | TRx4 | TRx1, TRx2, TRx3 |

METHOD AND APPARATUS FOR DETERMINING A PROPAGATION DELAY AND/OR A DISTANCE BETWEEN MULTIPLE TRANSCEIVERS, PARTICULARLY FOR A VEHICLE-ENTRY AND/OR STARTING SYSTEM

CROSS REFERENCE TO RELATED APPLICATIONS

This application is the U.S. National Phase Application of PCT International Application No. PCT/EP2017/069432, filed Aug. 1, 2017, which claims priority to German Patent Application No. 10 2016 215 934.8, filed Aug. 24, 2016, the contents of such applications being incorporated by reference herein.

BACKGROUND OF THE INVENTION

Method and apparatus for determining a propagation delay and/or a distance between multiple transceivers, particularly for a vehicle-entry and/or starting system

FIELD OF THE INVENTION

The invention relates to a method and an apparatus for determining a propagation delay and/or a distance between a plurality of transceivers, in particular for a vehicle entry and/or starting system.

SUMMARY OF THE INVENTION

One aspect of the invention optimizes determination of a propagation delay and/or a distance. Configurations of aspects of the invention can, as alternatives to existing solutions, make it possible to determine a distance and/or a propagation delay in a manner which is not susceptible to manipulation and/or in a reliable and/or efficient manner.

Configurations of aspects of the invention can be used in communication between a mobile key, for example a radio key and/or a transponder, and transceivers of a vehicle entry and/or starting system.

Configurations of aspects of the invention can be used to determine current distances between transceivers of a vehicle entry and/or starting system which are arranged/installed in the motor vehicle.

According to configurations of aspects of the invention, a signature of useful data and/or an address and/or a preamble can be used in messages.

BRIEF DESCRIPTION OF THE DRAWINGS

Further features and advantages of some advantageous configurations of aspects of the invention emerge from the following description of some exemplary embodiments of the invention with reference to the drawing.

In said drawing, to illustrate some possible configurations of aspects of the invention, in a simplifying manner.

DETAILED DESCRIPTION OF THE PREFERRED EMBODIMENTS

Configurations of the aspects of invention relate to apparatuses and methods for determining a propagation delay and/or a distance d; d12, . . . d56 between a plurality of transceivers keyfob, TRX1, TRX2, TRX3, TRX4, TRX5, TRX6, in particular between transceivers keyfob-LF, keyfob-UHF, keyfob-UWB, Vehicle-UWB-Trx1, Vehicle-UWB-Trx2, Vehicle-UWB-Trx3, Vehicle-UWB-TrxN, Vehicle-UHF, Vehicle-LF, outside and/or as part of a motor vehicle Kfz (in particular an automobile or a truck or an agricultural machine vehicle).

Figure 13:
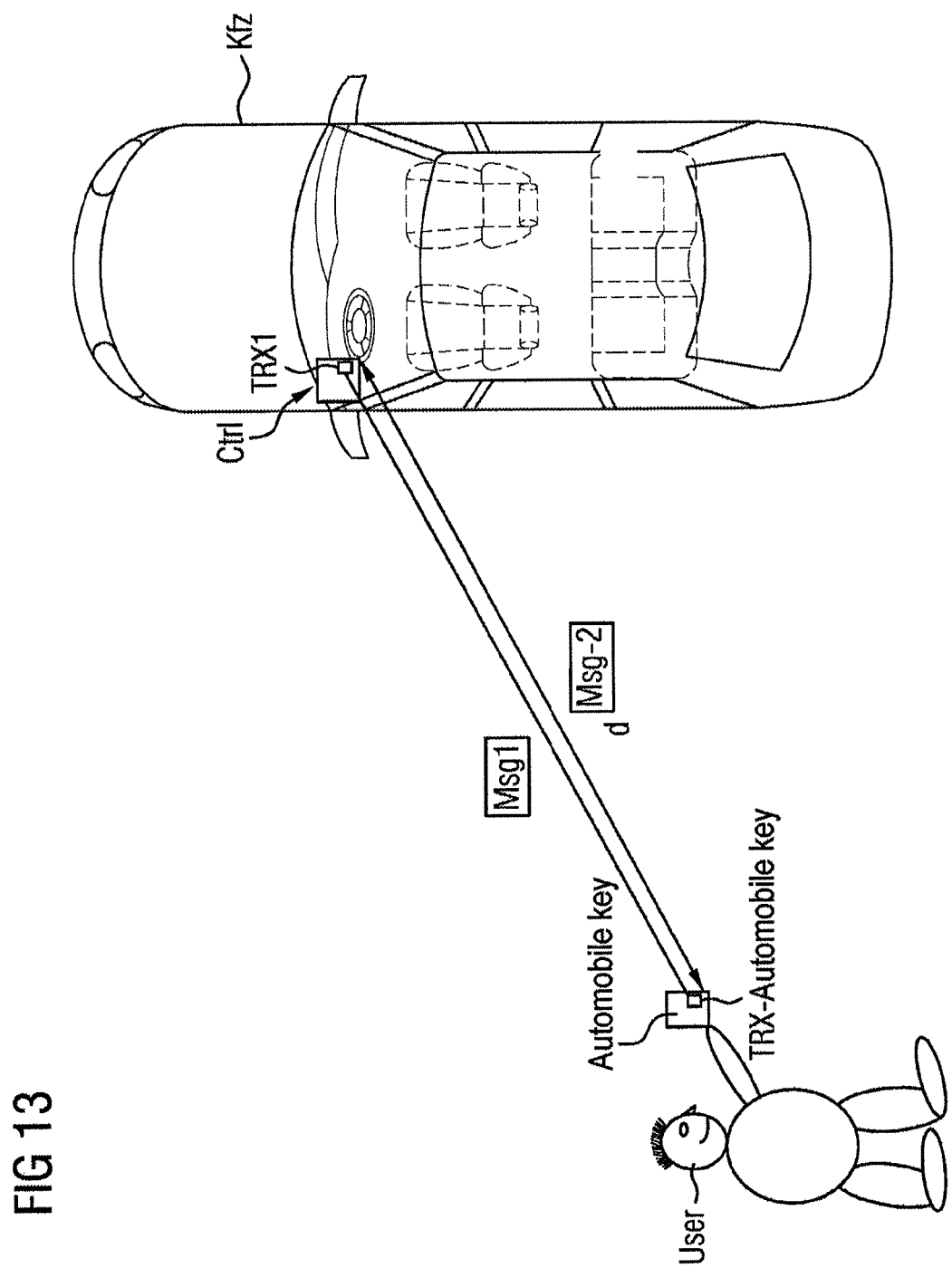

FIG. 13 shows, by way of example, with respect to one configuration of an aspect of the invention for e.g. an entry and/or starting system, in particular of a motor vehicle Kfz, determination of a propagation delay and/or (at least) one distance d between a transceiver keyfob (in the form of or as part of e.g. a mobile terminal and/or a radio key and/or an entry card element having one or, in FIG. 12, a plurality of transceivers) and (at least) one transceiver TRX1 (of the Kfz), between which (TRX1, keyfob), for example, two or three or more than three messages (as in FIG. 12 for example) are interchanged in both directions, for example, from the reception times and/or transmission times and/or propagation delays of which a distance d, for example, between the two transceivers keyfob, TRX1, can be determined, in order to be able to reliably detect, for example, the proximity or short propagation delay of the two transceivers keyfob, TRX1 as, for example, a prerequisite for opening and/or starting (the Kfz).

Figure 15:
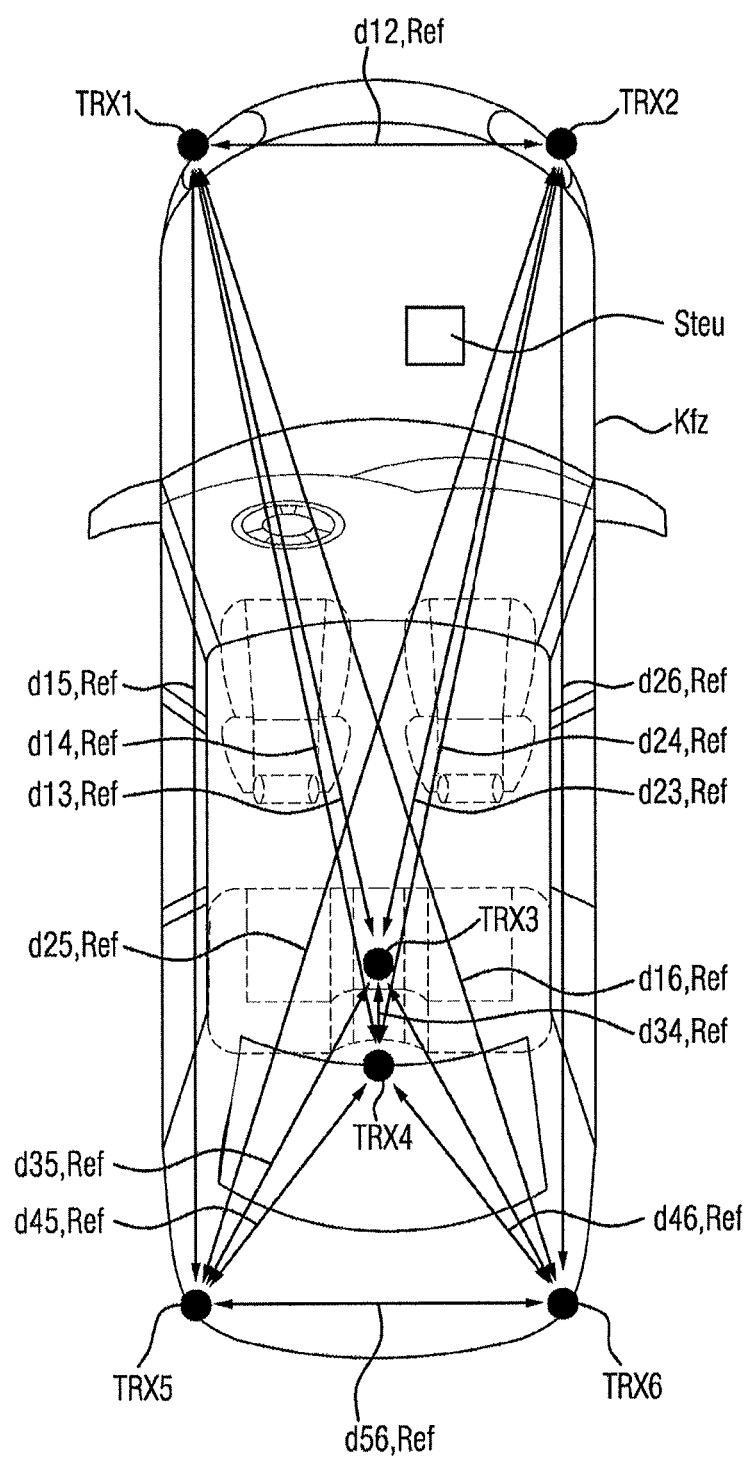

FIG. 15 shows, by way of example, with respect to one configuration of an aspect of the invention for e.g. an entry and/or starting system, in particular of a motor vehicle Kfz, determination of a propagation delay and/or a distance d12, d13, d14, d15, d16, d23, d24, d25, d26, d34, d35, d46, d45, d45, d46, d56 in each case between a plurality of transceivers TRX1, TRX2, TRX3, TRX4, TRX5, TRX6, for example as part of (in or on etc.) the motor vehicle Kfz, in order to be able to reliably detect, for example, either an unchanged distance between these transceivers or possibly manipulation.

Codes C1, C2 ... Cn generated in the transceivers keyfob, TRX1, TRX2, TRX3, TRX4, TRX5, TRX6 can be used in messages for this purpose, which codes (or else values derived therefrom) for (for example (possibly in each case) two or three) messages can be used to determine a propagation delay and/or a distance d (FIG. 13); d12, d13, d14, d15, d16, d23, d24, d25, d26, d34, d35, d46, d45, d45, d46, d56 (FIG. 15).

Codes C1 ... Cn and/or values A1 ... An, P1 ... Pn, S1 ... Sn derived therefrom can make it more difficult, for example, for third parties to decrypt and/or manipulate communication using the messages.

Figure 1:
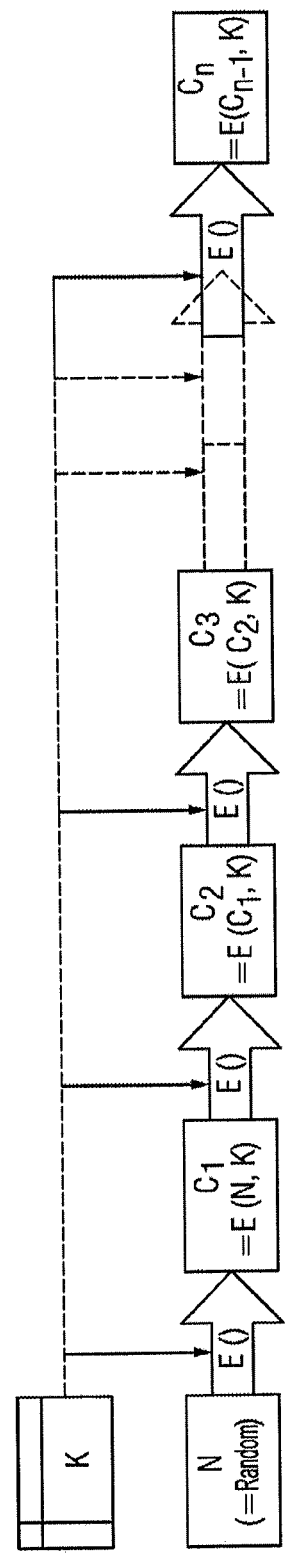
FIG. 1 schematically shows generation of a plurality of (here identical) codes in a plurality of transceivers from at least one transmitted starting value and possibly an additional key using a calculation method known to each of said transceivers, FIG. 2 schematically shows generation of a plurality of codes, FIG. 3 schematically shows generation of a preamble at least from one of the codes, FIG. 4 schematically shows generation of a preamble from one of the codes and possibly an additional key, FIG. 5 schematically shows generation of a preamble from one of the codes and possibly an additional key, FIG. 6 schematically shows generation of an address and/or a signature (of useful data) from one of the codes and possibly an additional key, FIG. 7 schematically shows generation of an address and/or a signature (of useful data) from one of the codes and possibly an additional key, FIG. 8 schematically shows an address within the useful data of a message, FIG. 9 schematically shows filtering of messages received in the transceivers in each case at least on the basis of a code contained in a respective message and/or a value derived therefrom by means of comparison with codes and/or value stored as filters, FIG. 10 schematically shows formats of messages having an address in useful data of the message, FIG. 11 schematically shows formats of messages having an address and/or a signature (of useful data) and/or a preamble which is present once or twice in a preamble and/or in useful data of the messages, FIG. 12 schematically shows transmission and reception of a plurality of messages each with (at least) one code and/or one value derived therefrom, FIG. 13 schematically shows a radio key or a transponder etc., for example outside a vehicle, which is intended to open and/or start a motor vehicle using messages containing codes, FIG. 14 schematically shows messages which are each filtered by transceivers and the useful data/time stamps/reception times of which are used to determine at least one distance and/or one propagation delay, and FIG. 15 schematically shows the determination of distances between transceivers (for example which can each be used for communication with a radio key) as part of a motor vehicle by said transceivers using messages each having at least codes and/or values derived therefrom.

FIG. 1 shows for this, by way of example, with respect to one configuration of an aspect of the invention, the generation of the codes C1; C2; C3; C4; C5; C6; C7; C2+n; C3+n in a plurality of these transceivers (for example in keyfob, TRX1 in FIG. 13 or, for example, in (possibly keyfob and:) TRX1, TRX2, TRX3, TRX4, TRX5, TRX6 in FIG. 15), using a calculation method E known to them (referred to as E for short, for example, below), from, for example, at least one starting value N transmitted, in particular, from one of the transceivers (keyfob-LF, keyfob-UHF, keyfob-UWB, Vehicle-UWB-Trx1, Vehicle-UWB-Trx2, Vehicle-UWB-Trx3, Vehicle-UWB-TrxN, Vehicle-UHF, Vehicle-LF, TRx1, Trx2, Trx3, Trx4, TRx5, Trx6) to the further transceivers (keyfob-LF, keyfob-UHF, keyfob-UWB, Vehicle-UWB-Trx1, Vehicle-UWB-Trx2, Vehicle-UWB-Trx3, Vehicle-UWB-TrxN, Vehicle-UHF, Vehicle-LF, TRx1, Trx2, Trx3, Trx4, TRx5, Trx6), and preferably also from an additional key in the form of a secret key k (which is stored in the transceivers, for example when teaching the key keyfob to the transceivers as part of the motor vehicle Kfz and/or when teaching the transceivers as part of the motor vehicle Kfz to one another) and/or a session key k (which is transmitted, for example in an encrypted manner, between the transceivers, for example before measuring a distance).

keyfob-LF, keyfob-UHF, keyfob-UWB can also denote the type of modulation used by a physical transceiver keyfob (common to keyfob-LF, keyfob-UHF, keyfob-UWB). A physical transceiver keyfob can therefore use a plurality of types of modulation (referred to as keyfob-LF, keyfob-UHF, keyfob-UWB, for example, in a simplifying manner) in succession.

The calculation method E may be, for example, any desired calculation based on N or on N and k, for example the square thereof or any desired power or sum with a secret or an exponential function etc. or a mixture thereof etc.

In FIG. 1, a first code C1 is calculated in, for example, one or more or all of the transceivers (for example in keyfob, TRX1 in FIG. 13 or, for example, in (possibly keyfob and:) TRX1, TRX2, TRX3, TRX4, TRX5, TRX6 in FIG. 15), using a calculation method E known to it/them, from the starting value N or from the starting value N and possibly the additional key k (secret key and/or session key).

In FIG. 1, a second code C2 is then calculated in, for example, a plurality or all of the transceivers (for example in keyfob, TRX1 in FIG. 13 or, for example, in (possibly keyfob and:) TRX1, TRX2, TRX3, TRX4, TRX5, TRX6 in FIG. 15), using a calculation method E known to them, from the starting value N (or a code C1) or from the starting value N (or a code C1) and the additional key k (secret key and/or session key), for example by using the calculation method E twice, that is to say, for example, by using the result (C1) of the first use of the calculation method E as a new starting value for the calculation method E the second time (instead of N the first time), that is to say E2=E(E(N))=E(C1) or E2=E(E(N,K))=E(C1,K).

In FIG. 1, a generally nth (N: natural number, for example >0 or >2) code Cn (for example in the case of more than two transceivers) is then possibly calculated in, for example, a plurality or all of the transceivers (for example in keyfob, TRX1 in FIG. 13 or, for example, in (possibly keyfob and:) TRX1, TRX2, TRX3, TRX4, TRX5, TRX6 in FIG. 15), using a calculation method E known to them, from the starting value N or from the starting value N and the additional key k (secret key and/or session key), by using the calculation method E n times, that is to say, for example, by using the result (C1) of the (n−1)th or previous use of the calculation method E as a new starting value for the calculation method E the nth time, that is to say En=E''(N)=E($C_{n-1}$) or En=E''(N, K)=E($C_{n-1}$).

Represented as a formula, this is, for example:

$C_1$=E(N,K) (referred to in a simplifying manner as: $E^1$(N, K))

$C_2$=E($C_1$,K)=E (E(N,K)) (referred to in a simplifying manner as: $E^2$(N,K))

$C_n$=E($C_{n-1}$,K)=E( ... (E''(N,K) ... ) (in a simplifying manner: E''(N,K))

Figure 2:
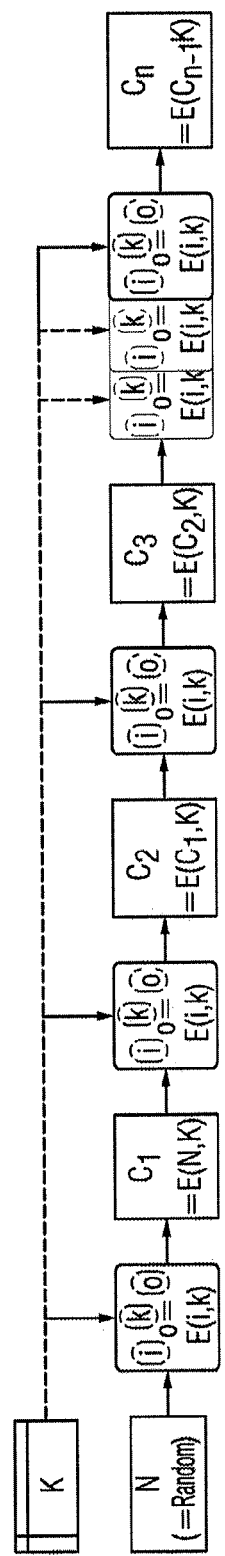

FIG. 2 shows this in a different representation to FIG. 1, wherein, in FIG. 2, the output value o of a calculation (using the calculation method E) may respectively be an input value i for a subsequent calculation (using the calculation method E), for example apart from in the first case (furthest left in FIG. 2) with the starting value N and in the last case (furthest right in FIG. 2).

Such a code C1; C2; C3; C4; C5; C6; C7; C2+n; C3+n can be used, for example, in successive messages Msg; for example, a different code C1; C2; C3; C4; C5; C6; C7; C2+n; C3+n than in the messages before or after can be respectively used in successive messages (for example in the case of a distance determination, as in FIG. 15 or FIG. 13, and/or during opening/starting, as in FIG. 13 etc.).

Figure 3:
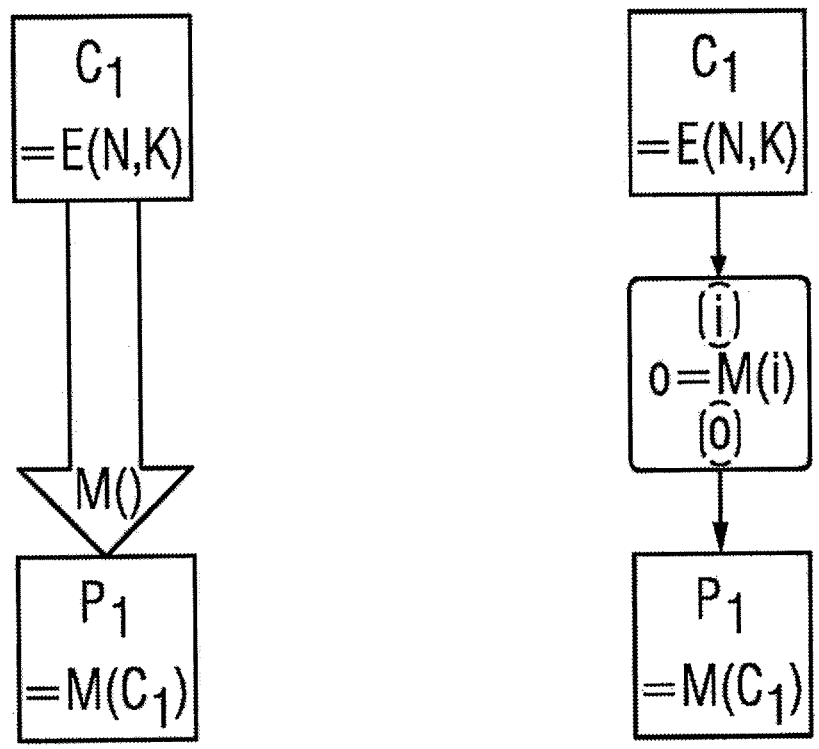

FIG. 3 shows, as one configuration of an aspect of the invention, generation of a preamble P; P1 ... Pn from a code using a preamble generation function M, on the left in FIG. 3 as generation of a preamble P1 (only) from a code C1 (or from a code C1 and an additional key k) using a preamble generation function M (known to all transceivers, for example), and, on the right in FIG. 3, with an additional indication of the input of a preamble generation function M as i and of the output of a preamble generation function M.

A preamble generation function M may be any desired calculation based on N or on N and k, for example the square thereof or any desired power or sum with a secret or an exponential function etc. or a mixture thereof etc.

Figure 4:
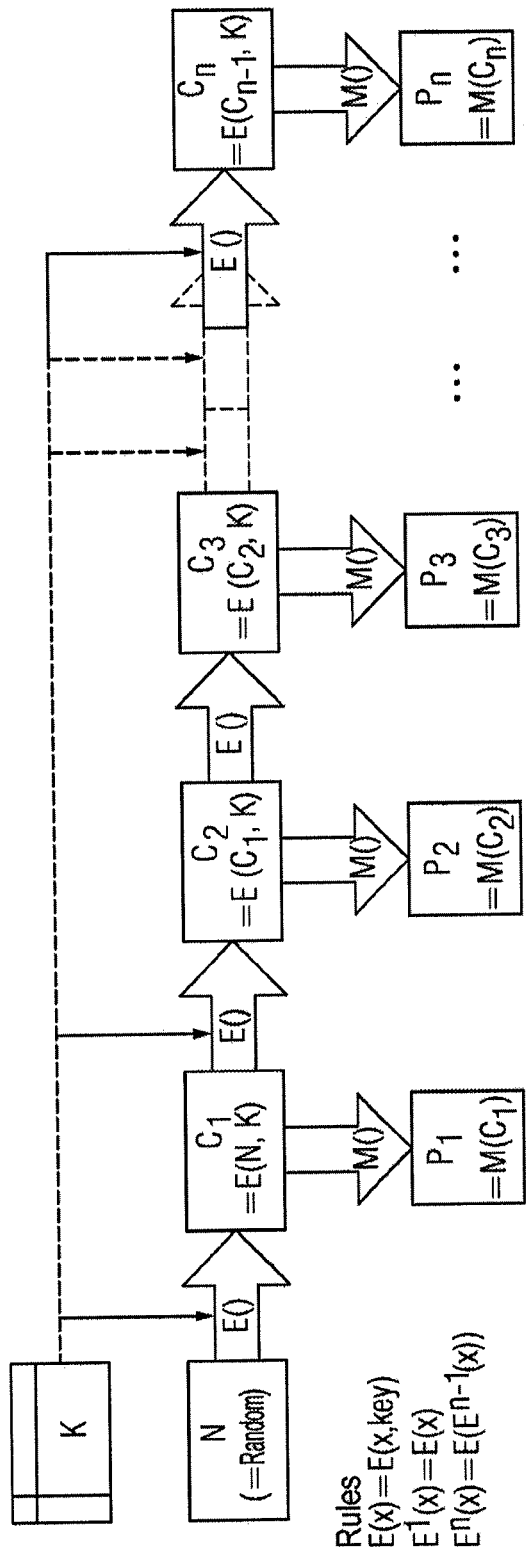
Figure 5:
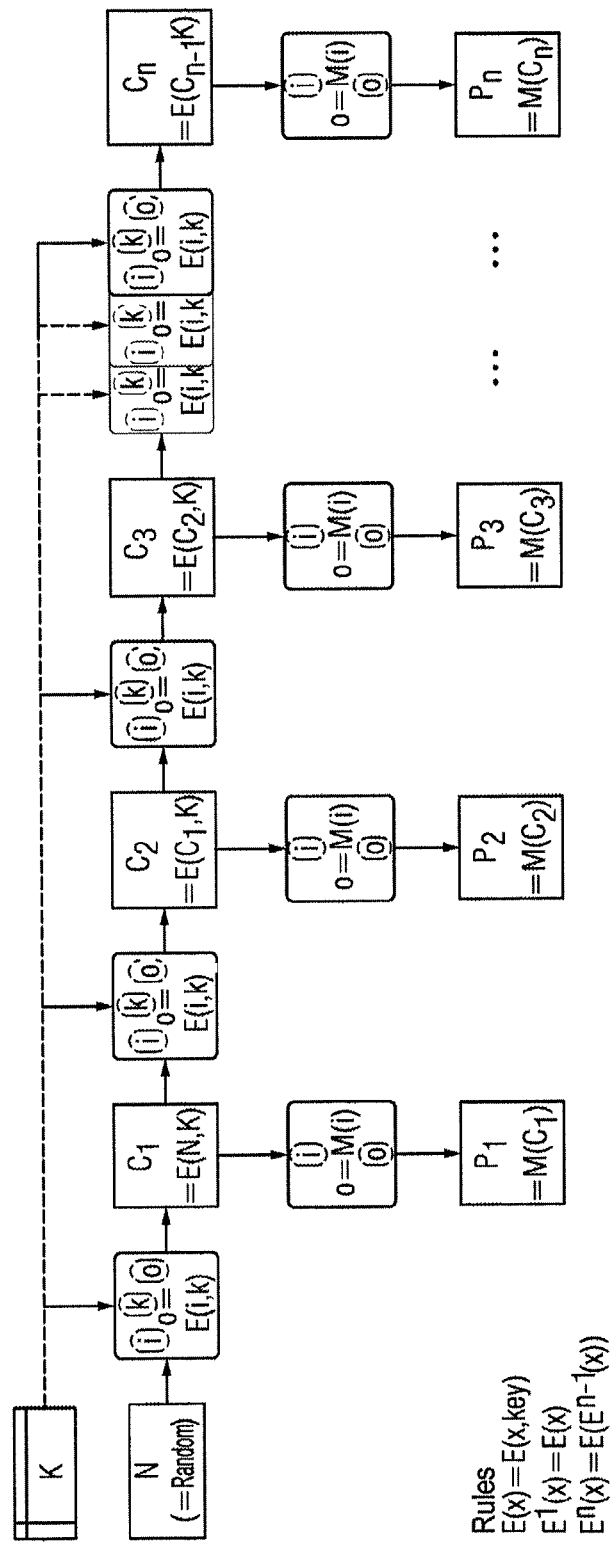

FIG. 4 and FIG. 5 each show, as one configuration of an aspect of the invention, generation of a plurality of preambles P; P1 . . . Pn from a code C; C1 . . . Cn (wherein a code C; C1 . . . Cn has been respectively generated from a starting value N and from a starting value N and from an additional key k by using a calculation method E once for the code C1 and twice for the code C2, etc., see above).

As described below with respect to FIG. 11 for example, a preamble P can be used to increase the security against manipulation or generation of messages by unauthorized third parties, in particular with a preamble as a value transmitted in one or more messages.

Figure 6:
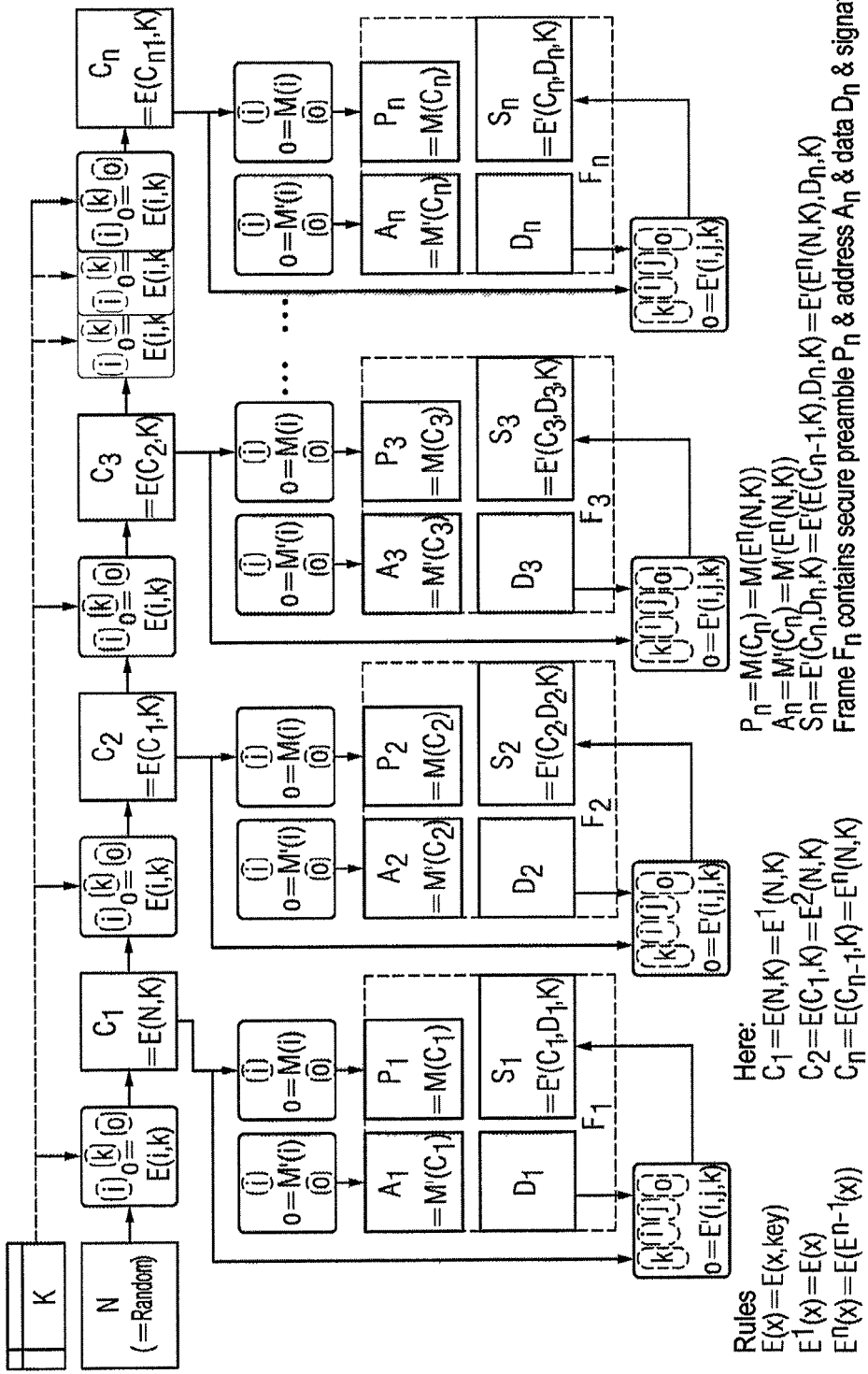
Figure 7:
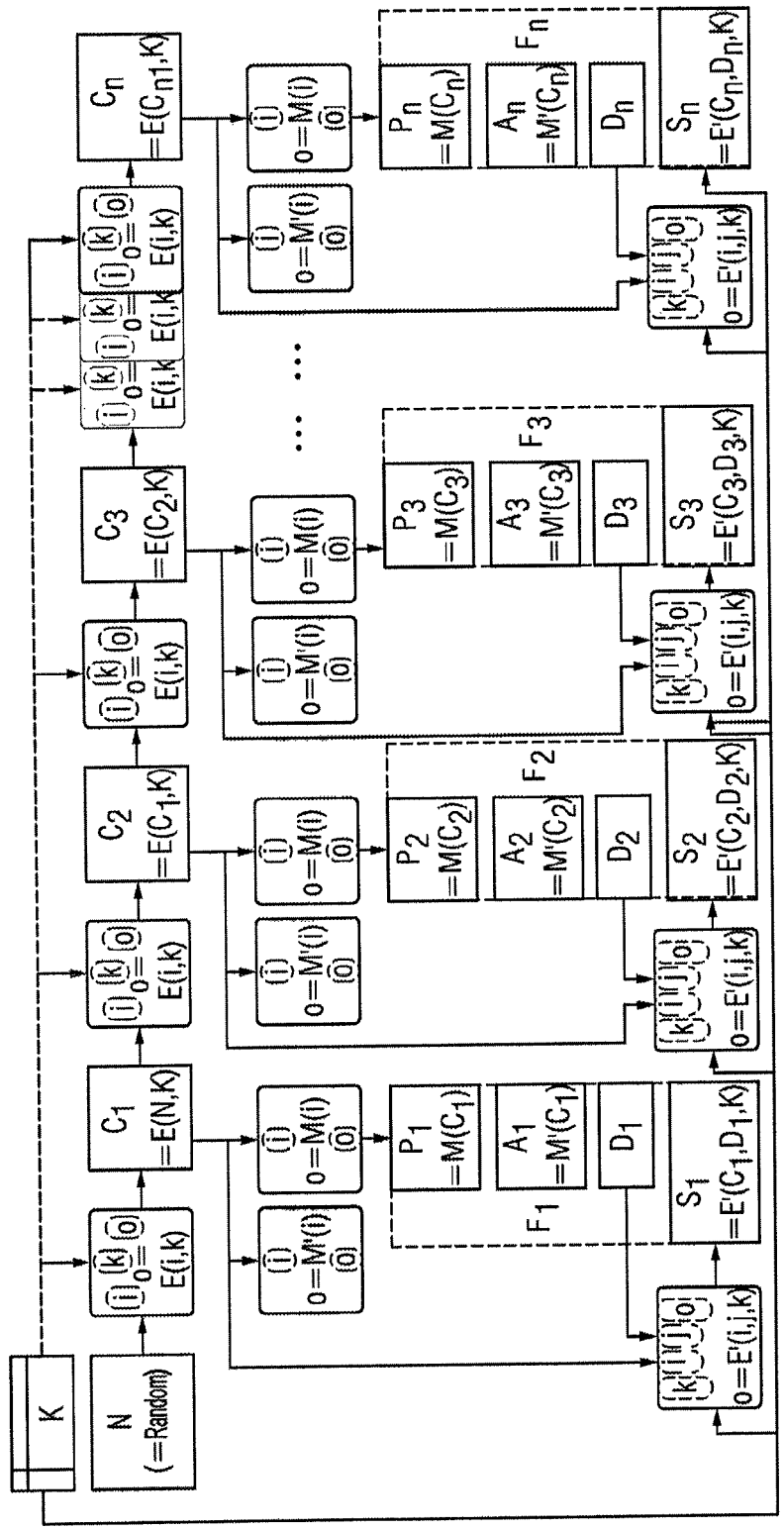
Figure 8:
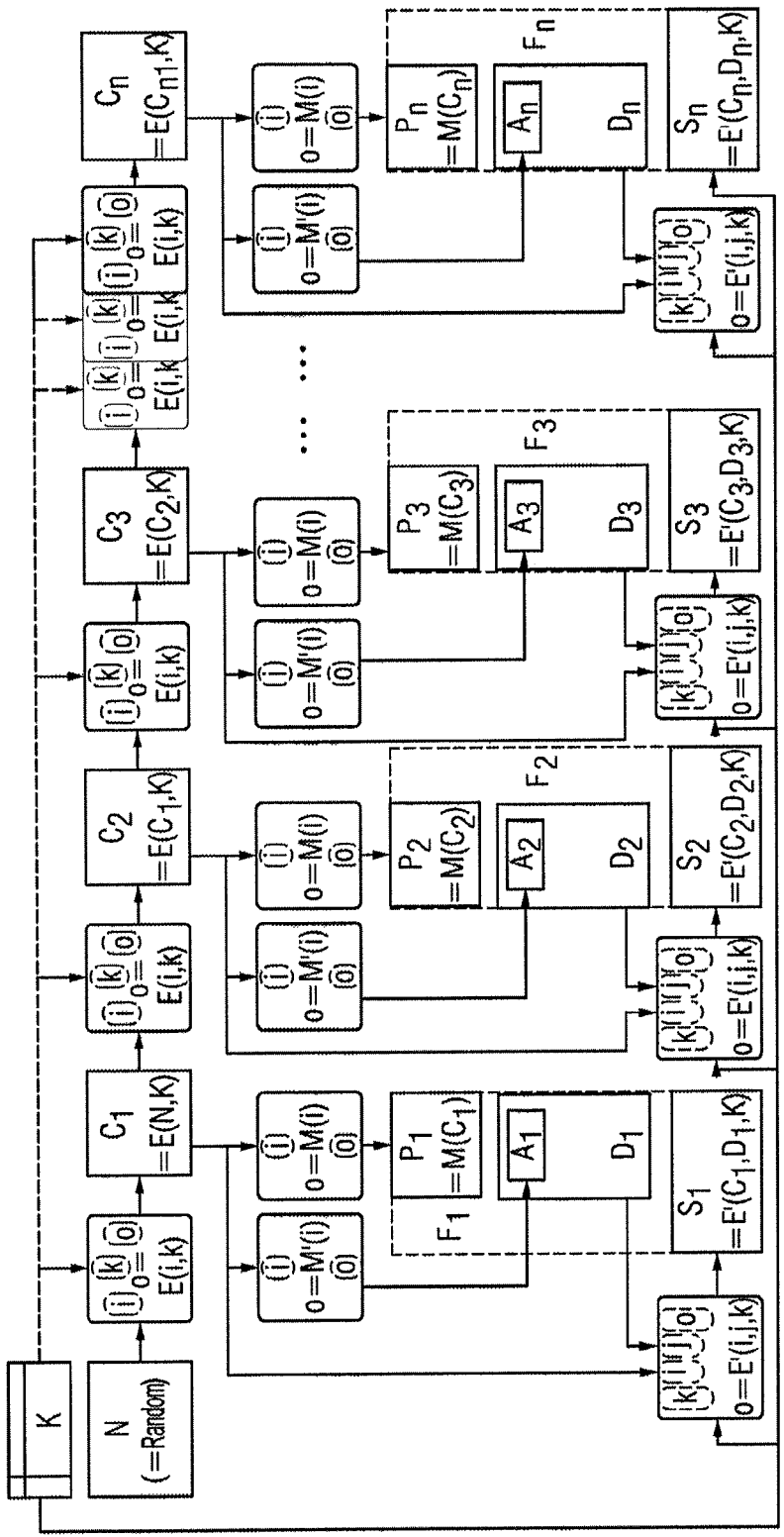

FIGS. 6, 7, 8 each show, as one configuration of an aspect of the invention, generation of an address A; A1 . . . An using an address generation function M'
and/or of a signature S; S1 . . . Sn using a signature generation function E'
in each case from a code C; C1 . . . Cn (wherein a code C; C1 . . . Cn has been respectively generated from a starting value N or from a starting value N and from an additional key k by using a calculation method E once for the code C1 and twice for the code C2, etc., see above).

As described below with respect to FIG. 11 for example, an address A; A1 . . . An and/or a signature S; S1 . . . Sn can be used to increase the security against manipulation or generation of messages by unauthorized third parties, in particular with an address and/or with a signature as a value transmitted in one or more messages.

An address A; A1 . . . An indicated (for example as in FIG. 10 or 11) in a message Msg can be, for example, at a position in data D; D1 . . . Dn in the message Msg resulting from the address A and can then be checked upon reception in order to prevent manipulations by third parties, in particular with a signature as a value transmitted in one or more messages.

An address A; A1 . . . An indicated in a message Msg can also be used by the recipient of the message to determine whether the message (that is to say, in particular, useful data such as time stamps and/or the reception time thereof etc.) is intended to be used by said recipient to determine a propagation delay and/or a distance, in particular to the sender of the message.

One or more messages Msg; Msg-Sync, Msg-Wm Msg-Chal, Msg-1, Msg-2, Msg-3, Msg-4, Msg-5, Msg-2+n, Msg-3+n transmitted by one of the transceivers keyfob-LF, keyfob-UHF, keyfob-UWB, Vehicle-UWB-Trx1, Vehicle-UWB-Trx2, Vehicle-UWB-Trx3, Vehicle-UWB-TrxN, Vehicle-UHF, Vehicle-LF, TRx1, Trx2, Trx3, Trx4, TRx5, Trx6 in each case can therefore contain values based on one of the codes C1, C2 . . . Cn, for example the codes C1, C2 . . . Cn themselves and/or values (A; A1 . . . An; P; P1 . . . Pn; S; S1 . . . Sn) formed (M'; M; E') from one of the codes C1; C2; C3; C4; C5; C6; C7; C2+n; C3+n in each case, such as, in particular, at least one address A; A1 . . . An and/or at least one signature S; S1 . . . Sn and/or at least one preamble P; P1 . . . Pn.

(At least) one address A; A1 . . . An (calculated, for example, from one of the codes C1; C2; C3; C4; C5; C6 . . . Cn and possibly from k) in transmitted messages Msg can prompt, for example, (at least one) transceiver (for example keyfob-LF, keyfob-UHF, keyfob-UWB, Vehicle-UWB-Trx1 (for example corresponding to TRx1), Vehicle-UWB-Trx2 (for example corresponding to TRx2), Vehicle-UWB-Trx3 (for example corresponding to TR3) . . . Vehicle-UWB-TrxN (for example corresponding to TR4), Vehicle-UHF (for example corresponding to TRx5), Vehicle LF (for example corresponding to TRx6), TRx1, Trx2, Trx3, Trx4, TRx5, Trx6) receiving the messages Msg (that is say, for example, Msg-Sync, Msg-W, Msg-1, Msg-2, Msg-3, Msg-4, Msg-5, Msg-2+n, Msg-3+n) to filter out precisely these messages on the basis of the address A; A1 . . . An and/or a code C1; C2; C3; C4; C5; C6 . . . Cn (for example to the effect that it is used by the transceiver to determine a propagation delay and/or a distance, for example, as explained in more detail by way of example below with reference to FIG. 9).

In FIG. 7, parameters which are included in a calculation are each additionally denoted using i or j or k, for example, and results of a calculation (E or M or M' etc.) are each denoted o, for example.

Figure 9:
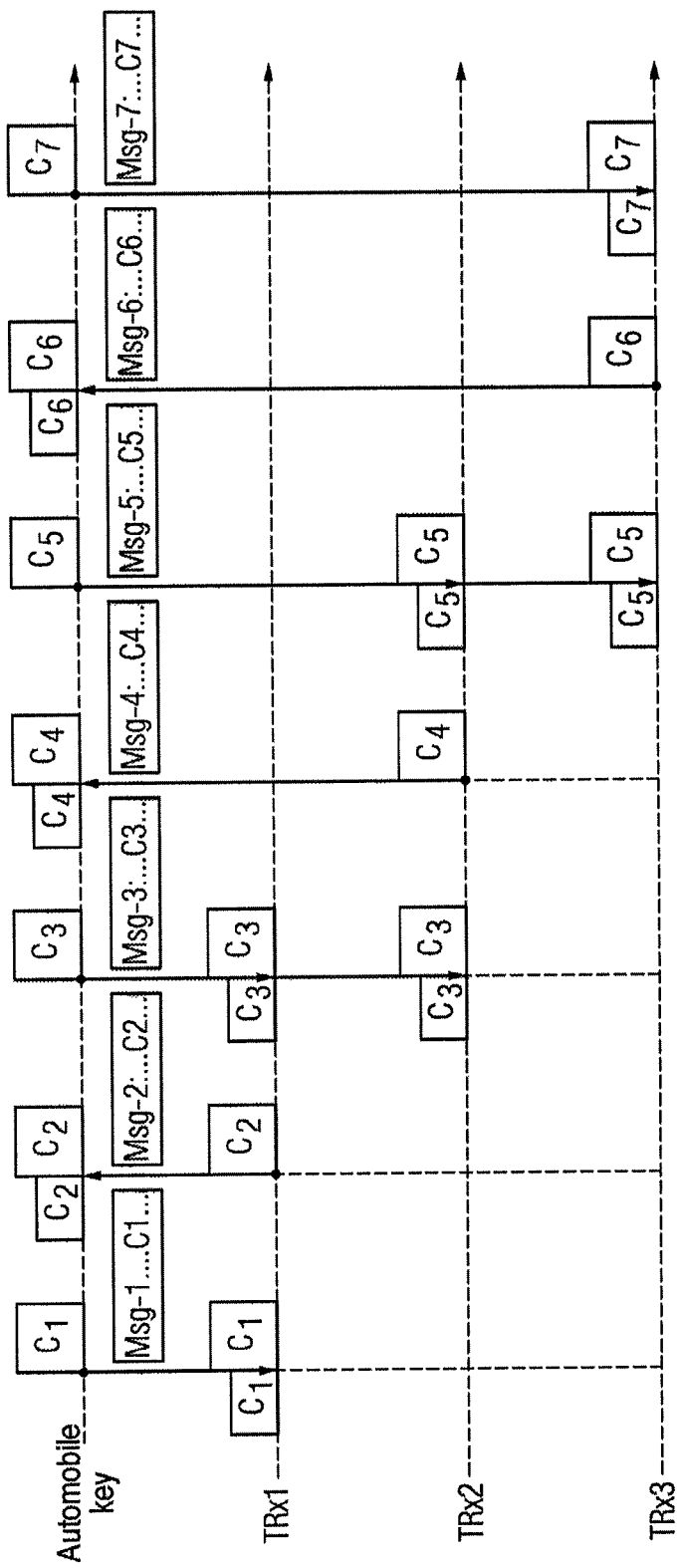

FIG. 9 and FIG. 12 each show, as one configuration of an aspect of the invention, use of (at least) one of the codes C1; C2; C3; C4; C5; C6; C7 in successive messages Msg (Msg-1, Msg-2, Msg-3, Msg-4, Msg-5, Msg-6, Msg-7 (and, in FIG. 12, Msg-2+n; Msg3+n)) as the address (in the form of at least one of the transceivers) of the message in each case.

For example, if the transceivers (for example keyfob, TRX1 in FIG. 13 or, for example (possibly keyfob and:) TRX1, TRX2, TRX3, TRX4, TRX5, TRX6 in FIG. 15) know the order in which they are intended to transmit messages Msg in succession on the basis of, for example, a serial number (which can be compared by radio) stored in them or on account of a detected (radio) bus collision or on the basis of numbering when teaching the transceivers to one another etc., each transceiver can concomitantly transmit the nth of the codes C1; C2; C3; C4; C5; C6; C7; C2+n; C3+n or a value A1 . . . n; P1 . . . n; S1 . . . n based thereon in the (nth) message to be transmitted by it, that is to say, for example, the code C1 or A1/P1/S1 in the first message Msg1, the code C2 or A2/P2/S2 in the message Msg 2 etc.

Each of the transceivers can filter out (and/or consider) (for example according to a scheme determined when teaching the transceivers to one another, for example) those messages of all received messages Msg which contain one or more of the codes C1; C2; C3; C4; C5; C6; C7; C2+n; C3+n or values A1 . . . n; P1 . . . n; S1 . . . n based thereon and therefore, for example, messages Msg from one or more further transceivers respectively specified to said transceiver.

In FIG. 9, the transceiver Trx1, for example, filters out messages which are received by it and have the code C1 stored (in the transceiver Trx1 for this purpose) (such as the message Msg-1 from the transceiver keyfob here).

Furthermore, the transceiver keyfob, for example, filters out messages which are received by it and have the stored code C2 (such as the message Msg-2 from the transceiver Trx-1 here).

Furthermore, the transceiver Trx1 and also the transceiver Trx2, for example, filter out messages which are received by them and have the stored code C3 (such as the message Msg-3 from the transceiver keyfob here).

Furthermore, the transceiver keyfob, for example, filters out messages which are received by it and have the stored code C4 (such as the message Msg-4 from the transceiver Trx-2 here).

Furthermore, the transceiver Trx2 and also the transceiver Trx3, for example, filter out received messages having the stored code C5 (such as the message Msg-5 from the transceiver keyfob here).

Furthermore, the transceiver keyfob, for example, filters out messages which are received by it and have the stored code C6 (such as the message Msg-6 from the transceiver Trx-3 here).

Furthermore, the transceiver Trx3, for example, filters out messages which are received by it and have the stored code C7 (such as the message Msg-7 from the transceiver keyfob here).

The messages which are filtered out by a transceiver can be stored in said transceiver, for example (for example here keyfob: generally all messages transmitted with a code C2 or C4 or C6 which is possibly yet to be calculated (for example with k); as a general specification).

A transceiver can filter out the messages which it intends to use to determine a distance, for example, and can ignore the message if the address field is incorrect (for example in order to prevent manipulation).

Possible formats of messages are, for example, an IEEE 802.15.4 protocol or a protocol for a Decawave DW-1000 chipset or an address in the form of a MAC address etc.

FIG. 10 shows, by way of example, how a stored code C (for example one of the codes C1 to C7) or a value (A; P; S) generated therefrom can be respectively included in a message Msg (for example one of the messages Msg-1 to Msg-7 etc.).

For example, a defined field "Destination Address" having a length of eight octets, for example, is included in a transmitted message Msg-1 at the top of FIG. 10 with a code (for example Code1) or (at least) one address (for example A3).

For example, a defined field "Destination Address" having a length of eight octets, for example, with a code (for example Code1) or a value (A; P; S) generated therefrom is stored in one or more or each of the transceivers (for example in an Extended Unique Identifier).

The defined field "Destination Address" (containing the code C1 for example) in a message Msg-1 transmitted by one transceiver and received by a further transceiver can be compared with a field "Destination Address" stored in the receiving transceiver (as Mem-1) for the purpose of filtering messages.

FIG. 11 shows, below one another, three examples of the structure of a message Msg (for example one of the messages Msg1-Msg7 etc.) in the form of a frame, for example.

A message Msg-1 may contain, for example, (at least) one preamble P and/or (at least) one field containing useful data D; Dn (for example at least one time specification T00; T11; T22; T33; Tnn; Tm0) and/or (at least) one field containing an address A; An and/or (at least) one field containing a signature S; S1 . . . Snn (for example determined from useful data D; D1 . . . Dn of the message Msg using a signature calculation function E'(i,k,k)).

The center of FIG. 11 shows, by way of example, the arrangement of these fields P and/or A and/or D (and possibly S) in a message having a frame structure according to an IEEE 802.15.4 protocol.

FIG. 14 shows, by way of example, how messages Msg received by the transceivers and respectively filtered there (for example according to FIG. 9) can be used to determine a distance d between two transceivers, for example on the basis of time stamps (such as T0$n$, T1$n$, T2$n$, T3$n$, Tnn in FIG. 12 in a message Msg as an indication of the transmission time of the message from a transceiver) and/or on the basis of the reception time (of at least one message by a transceiver) and/or on the basis of the reception time (of at least one message by a transceiver).

For example, (on account of the code therein) the message Msg-1 (in FIG. 14 for short: 1) from the transceiver keyfob is filtered out by the transceivers TRX1, TRX2, TRX3, TRX4 receiving this message.

For example, (on account of the code therein) the message Msg-2 (in FIG. 14 for short: 2) from the transceiver TRX1 is filtered out by the transceivers keyfob, TRX2, TRX3, TRX4 receiving this message.

For example, (on account of the code therein) the message Msg-3 (in FIG. 14 for short: 3) from the transceiver TRX2 is filtered out by the transceivers keyfob, TRX1, TRX3, TRX4 receiving this message.

For example, (on account of the code therein) the message Msg-4 (in FIG. 14 for short: 4) from the transceiver TRX3 is filtered out by the transceivers keyfob, TRX1, TRX2, TRX4 receiving this message.

For example, (on account of the code therein) the message Msg-5 (in FIG. 14 for short: 5) from the transceiver TRX4 is filtered out by the transceivers keyfob, TRX1, TRX2, TRX3 receiving this message.

For example, (on account of the code therein) the message Msg-6 (in FIG. 14 for short: 6) from the transceiver keyfob is filtered out by the transceivers TRX1, TRX2, TRX3, TRX4 receiving this message.

For example, (on account of the code therein) the message Msg-7 (in FIG. 14 for short: 7) from the transceiver TRX1 is filtered out by the transceivers TRX2, TRX3, TRX4 receiving this message.

For example, (on account of the code therein) the message Msg-8 (in FIG. 14 for short: 8) from the transceiver TRX2 is filtered out by the transceivers TRX1, TRX3, TRX4 receiving this message.

For example, (on account of the code therein) the message Msg-9 (in FIG. 14 for short: 9) from the transceiver TRX3 is filtered out by the transceivers TRX1, TRX2, TRX4 receiving this message.

For example, (on account of the code therein) the message Msg-10 (in FIG. 14 for short: 10) from the transceiver TRX4 is filtered out by the transceivers TRX1, TRX2, TRX3 receiving this message.

After the message Msg-6 (for short: 6), all transceivers (for example: TRX1 . . . TRX4) as part of the motor vehicle Kfz could each calculate a propagation delay and/or a distance d from themselves to a transceiver (for example radio key) outside the motor vehicle Kfz.

For example, after the message Msg-7 (for short: 7), the transceivers TRX2, TRX3, TRX4 as part of the motor vehicle Kfz could each calculate a propagation delay and/or their distance d to the transceiver TRX1 as part of the motor vehicle Kfz.

For example, after the message Msg-8 (for short: 8), the transceivers TRX1, TRX3, TRX4 as part of the motor vehicle Kfz could each calculate a propagation delay and/or their distance d to the transceiver TRX2 as part of the motor vehicle Kfz.

For example, after the message Msg-9 (for short: 9), the transceivers TRX1, TRX2, TRX4 as part of the motor vehicle Kfz could each calculate a propagation delay and/or their distance d to the transceiver TRX3 as part of the motor vehicle Kfz.

For example, after the message Msg-10 (for short: 10), the transceivers TRX1, TRX2, TRX3 as part of the motor vehicle Kfz could each calculate a propagation delay and/or their distance d to the transceiver TRX4 as part of the motor vehicle Kfz.

(For optimization, messages 9 and 10 could possibly be omitted.)

(At least) one address A; A1 . . . An (calculated, for example, from one of the codes C1; C2; C3; C4; C5; C6 . . . Cn and possibly from k using M' etc.) (or alternatively at least one of the codes C1 . . . Cn as an address) in transmitted messages Msg can prompt, for example, (at least one) transceiver (for example keyfob-LF, keyfob-UHF, keyfob-UWB, Vehicle-UWB-Trx1 (for example corresponding to TRx1), Vehicle-UWB-Trx2 (for example corresponding to TRx2), Vehicle-UWB-Trx3 (for example corresponding to TRx3) . . . Vehicle-UWB-TrxN (for example corresponding to TRx4), Vehicle-UHF (for example corresponding to TRx5), Vehicle LF (for example corresponding to TRx6), TRx1, Trx2, Trx3, Trx4, TRx5, Trx6) receiving the messages Msg (that is say, for example, Msg-Sync, Msg-W, Msg-1, Msg-2, Msg-3, Msg-4, Msg-5, Msg-2+n, Msg-3+n) to filter out precisely these messages Msg on the basis of the address A; A1 . . . An (or a code C1; C2; C3; C4; C5; C6 . . . Cn) (for example to the effect that it is used by the transceiver to determine a propagation delay and/or a distance, for example, as explained in more detail with reference to FIG. 9).

Instead of addresses A; An (calculated from one of the codes C1 . . . Cn) in FIGS. 10, 11, codes C1 . . . Cn can also be used, as in FIG. 9 (as addresses which can request the at least one transceiver to filter out the message).

One, more or each of the transceivers (for example keyfob-LF, keyfob-UHF, keyfob-UWB, Vehicle-UWB-Trx1 (for example corresponding to TRx1), Vehicle-UWB-Trx2 (for example corresponding to TRx2), Vehicle-UWB-Trx3 (for example corresponding to TRx3) . . . Vehicle-UWB-TrxN (for example corresponding to TRx4), Vehicle-UHF (for example corresponding to TRx5), Vehicle LF (for example corresponding to TRx6), TRx1, Trx2, Trx3, Trx4, TRx5, Trx6) may previously know or have stored the specification, for example, that it respectively filters out the messages received with one or more addresses A; A1 . . . An (or codes C1; C2; C3; C4; C5; C6 . . . Cn) therein and uses them to determine a distance and/or a propagation delay, for example.

A distance (with distance d=propagation delay–time difference times the speed of light in air c-air) can be determined, for example, from a determination of the propagation delay. A propagation delay is, for example (stated very simply), a time difference, for example simply between the transmission of a first message and the reception of the message (for example, in the case of synchronized clocks, with the transmission of the first message with a time stamp T0n, T1n . . . Tmn in the useful data D; D1 . . . Dn of a message Msg, and measurement of the difference to the time of arrival upon reception; possibly with transmission of the time difference or a distance back to the sender of the message).

This is possible, for example, as UWBpingkey in Msg-2 and UWMpongTrX in Msg-3 with respect to transceivers keyfob-UWB and Vehicle-UWB-TRX1 and their distance d in FIG. 12.

In FIG. 12, for example in a simple variant, the vehicle key and/or transponder keyfob having the transceiver keyfob-UWB can determine the distance d (between the transceiver keyfob-UWB and the transceiver Vehicle-UWB-Trx1) from the propagation delay (T01-T00) of the message Msg-2 (namely, for example, from the transmission time stamp T00 therein and the reception time T01 in the transceiver Vehicle-UWB-Trx1) or, for example, from the propagation delay (T10-T11) of the message Msg-3 (namely from the transmission time stamp T11 (of the transceiver Vehicle-UWB-Trx1) in the message and the reception time T10 in the transceiver keyfob-UWB).

Alternatively, the useful data D; D1 . . . Dn of a message Msg, for example, may also respectively contain the time stamp of the transmission of this message, and a response message from the recipient of this message may contain the time stamp of the response message and of the message. One message may also be transmitted in one direction and two messages may be transmitted in the other direction, that is to say two messages and one response message or one message and two response messages.

FIG. 12 shows, as one configuration of an aspect of the invention, a use of one of the codes C1; C2; C3; C4; C5; C6; C7; C2+n; C3+n (and/or, although not illustrated, values A and/or P and/or Sig derived therefrom) in successive messages Msg as the address of the message in each case.

In FIG. 12, transceiver keyfob (for example a radio key keyfob) has a plurality of transceivers keyfob-LF, keyfob-UHF, keyfob-UWB which transmit and/or receive, for example, at mutually different frequencies and/or using different protocols, for example a transceiver keyfob-LF at LF and/or using an LF protocol, a transceiver keyfob-UHF at UHF and/or using a UHF protocol and a transceiver keyfob-UWB at a UWB frequency, and/or using a UWB protocol.

In FIG. 12, a plurality of transceivers Vehicle-UWB-Trx1 to Vehicle-UWB-TrxN, Vehicle-UHF and Vehicle-LF are also provided as part of the motor vehicle Kfz and transmit and/or receive, for example, at mutually different frequencies and/or using different protocols, for example a transceiver Vehicle-LF at LF and/or using an LF protocol, a transceiver Vehicle-UHF at UHF and/or using a UHF protocol and a plurality of transceivers Vehicle-UWBTrxN (corresponding, for example, to Trx1, Trx2, Trx3, Trx4, Trx5, Trx6 etc. in FIG. 15) at a UWB frequency and/or using a UWB protocol, wherein transceivers can transmit or receive at times T0n, T1n, T2n, T3n, Tnn, Tmm, for example.

A transmission interval Tfp between the transmission of the messages Msg-1 . . . Msg-mn (after the time T0i of a first message Msg-0i) may be 1 ms or another interval, for example.

Of the N (N=natural number, for example six) transceivers, one transceiver TRXi (i=natural number, for example i=one to i=six in succession), for example, respectively transmits a message Msg-ii (which can be received and/or filtered by some or a plurality of or all other transceivers) at the time Tii (which time Tii is concomitantly transmitted, for example, as a time stamp by the transmitting transceiver in the message Msg-ii), wherein Tii=T0i+i*Tfp, for example.

All received time stamps or only the filtered time stamps can be stored, for example.

In FIG. 13, at least one transceiver TRx (for example of the vehicle), for example, transmits a synchronization message Msg-Sync to the other bus subscribers using a CAN bus.

The control unit of the motor vehicle Kfz, for example, initiates the synchronization inside the vehicle, for example via a bus, for example CAN or LIN.

A transceiver Vehicle-LF then transmits a wake-up message Msg-W at a frequency LF and/or using a protocol LF.

A transceiver Vehicle-UHF (at a frequency UHF and/or using a protocol UHF) or, for example, a UWB transceiver (of the Kfz) then transmits a challenge message Msg-Chal containing the starting value N, for example, which message is received by one of the transceivers (for example keyfob-UHF), which generates a code C1 from the starting value N (and possibly also an additional key K) using the calculation method E and, transmits it in a message Msg-1 transmitted by them (UWB), whereupon the further transceivers respectively generate the codes C2 to Cn and possibly values A/P/S based thereon using E and transmit messages containing the codes C2 to Cn and/or possibly values A/P/S based thereon.

Alternatively, a UWB transceiver (of the Kfz) could transmit the starting value N to all (UWB) receiving transceivers in a (UWB) message, which message is received by transceivers Vehicle-UWB1-1 . . . Vehicle-UWBn and keyfob-UWB which generate codes C1 . . . Cn and/or possibly values A/P/S based thereon from the starting value N (and possibly also an additional key K) using the calculation method E and possibly transmit them.

In FIG. 12, the transceivers transmit in succession (here Vehicle-LF, Vehicle-UHF) in the following order:

Keyfob-UHF transmits a (UHF) message Msg-1 having a first code C1 and/or possibly values A/P/S based thereon.

Keyfob-UWB transmits a (UWB) message Msg-2 having a second code C2 and/or possibly values A/P/S based thereon.

VehicleTrx1 (=VehicleUWBTrx1) transmits a (UWB) message Msg-3 having a third code C3 and/or possibly values A/P/S based thereon.

VehicleTrx2 (=VehicleUWBTrx2) transmits a (UWB) message Msg-4 having a third code C5 and/or possibly values A/P/S based thereon.

VehicleTrx3 (=VehicleUWBTrx3) transmits a (UWB) message Msg-4 having a fourth code C4 and/or possibly values A/P/S based thereon.

VehicleTrxN (=VehicleUWBTrxN) transmits a (UWB) message Msg-2+n having a (2+n)th code C2+n and/or possibly values A/P/S based thereon.

Keyfob-UWB transmits a (UWB) message Msg3+n having a (3+n)th code C3+n and/or possibly values A/P/S based thereon.

The invention claimed is:

1. An apparatus for determining a propagation delay and/or a distance between a plurality of transceivers with transceivers outside a motor vehicle and/or transceivers as part of a motor vehicle wherein the transceivers are each designed:
    to generate codes from at least one starting value using a calculation method known to them;
    to transmit one or more messages by one of the transceivers in each case, which messages each contain at least one of the codes and/or at least one value respectively formed from one of the codes; and
    to determine at least one propagation delay and/or at least one distance between at least two of the transceivers.

2. The apparatus as claimed in claim 1, wherein the transceivers are each designed to determine a propagation delay and/or a distance between a plurality of transceivers:
    from the propagation delay and/or transmission times and/or reception times of the one or more messages.

3. The apparatus as claimed in claim 1, wherein one or more messages transmitted by one of the transceivers in each case contain values based on one of the codes, the codes themselves and/or values formed from one of the codes in each case such as an address and/or a signature and/or a preamble.

4. The apparatus as claimed in claim 1, wherein the transceivers are each designed:
    to generate the codes in a plurality of these transceivers, using a calculation method known to them, from at least one starting value transmitted from one of the transceivers to the further transceivers and also from an additional key in the form of a session key and/or secret key ( ).

5. The apparatus as claimed in claim 1, wherein the transceivers are each designed:
    to generate the codes in a plurality of these transceivers, using a calculation method known to them, from at least one starting value transmitted from one of the transceivers to the further transceivers and without an additional key in the form of a session key and/or a secret key.

6. The apparatus as claimed in claim 1, wherein the transceivers are each designed to generate at least one of the codes with repeated use of the calculation method in succession by using at least the transmitted starting value during the first use of the calculation method in precisely one or more of the transceivers, and by using, instead of the starting value, the result of the previous use of the calculation method during at least one subsequent use of the calculation method.

7. The apparatus as claimed in claim 1, wherein the transceivers are each designed to generate at least one of the codes with repeated use of the calculation method in succession, wherein messages which are transmitted in succession from the messages each contain one of the codes and/or at least one value respectively formed from one of the codes,
    wherein the code was generated with one use more of the calculation method than a code in a message transmitted beforehand by the same transceiver or a further transceiver.

8. The apparatus as claimed in claim 1, wherein the transceivers are each designed such that messages each containing a starting value and/or one of the codes and/or at least one value respectively formed from one of the codes are transmitted in a manner encrypted with an additional key.

9. The apparatus as claimed in claim 1, wherein the additional key is a secret key stored in the transceivers, a secret key stored in the transceivers when teaching a vehicle key to a motor vehicle.

10. The apparatus as claimed in claim 1, wherein the additional key is a session key transmitted between the transceivers, in a manner encrypted with a secret known to all transceivers.

11. The apparatus as claimed in claim 1, wherein at least one of the transceivers is arranged as part of a mobile terminal, a radio key or a card or a cellular mobile radio terminal.

12. The apparatus as claimed in claim 1, wherein one or more of the transceivers are arranged as part of a motor vehicle, in the form of an automobile or a truck or a bus.

13. The apparatus as claimed in claim 1, wherein the transceivers are each designed such that the starting value is transmitted from one of the transceivers to the further transceivers via a wired interface or a radio interface, via a radio interface and/or a frequency other than the wired interface or radio interface used to transmit further messages.

14. The apparatus as claimed in claim 1, wherein the transceivers are each designed to generate at least one address from one of the codes in each case using an address information generation function, wherein at least one address is respectively transmitted in one of the messages between at least two of the transceivers.

15. The apparatus as claimed in claim 1, wherein the transceivers are each designed to generate at least one preamble from at least one of the codes in each case using a preamble generation function (M; P=M(Cn); P=M(En(N, K))),
    wherein at least one preamble is respectively transmitted, together with useful data in the form of a time specification, in one of the messages between at least two of the transceivers.

16. The apparatus as claimed in claim 1, wherein the transceivers are each designed to generate at least one signature from at least one of the codes in each case and from useful data using a signature generation function, wherein at least one value in the form of a signature is respectively transmitted together with useful data used to generate said signature, said useful data in the form of a time specification in at least one of the messages, between at least two of the transceivers.

17. The apparatus as claimed in claim 1, wherein the transceivers are each designed to determine a time specification to be transmitted as useful data in at least one of the messages to one or more further ones of the transceivers before transmitting the message, using a clock.

18. The apparatus as claimed in claim 1, wherein said apparatus is an entry and/or starting system, of a motor vehicle, which system is designed to use
propagation delays of at least one message and/or
useful data in the form of a time specification which are transmitted in one of the messages between at least two of the transceivers and/or
a time at which a message is received, as determined in at least one of the transceivers and/or
a time at which a message is transmitted, as determined in at least one of the transceivers to calculate at least one propagation delay and/or distance between at least two of the transceivers.

19. The apparatus as claimed in claim 1, wherein said apparatus is an entry and/or starting system, of a motor vehicle, which system is designed to use precisely two or precisely three messages to calculate at least one propagation delay and/or distance between at least two of the transceivers.

20. The apparatus as claimed in claim 1, wherein said apparatus is an entry and/or starting system, of a motor vehicle, which system is designed to filter out the messages to be used by one of the transceivers in each case to determine the distance and/or propagation delay in said transceiver from a plurality of the messages by comparing at least one of the codes contained in a message and/or at least one value formed from one of the codes with at least one code likewise calculated in said transceiver and/or at least one value respectively formed from one of the codes.

21. The apparatus as claimed in claim 1, wherein said apparatus is an entry and/or starting system, of a motor vehicle, the transceivers of which are each designed such that codes and/or at least one value respectively formed from one of the codes is/are generated in succession in one of the transceivers in the order in which the transceivers transmit, and/or the order in which the transceivers transmit is defined on the basis of information which is stored in said transceivers and stipulates the order.

22. The apparatus as claimed in claim 1, wherein said apparatus is an entry and/or starting system, of a motor vehicle, the transceivers of which are designed to calculate at least one propagation delay and/or distance between at least two of the transceivers which are all arranged as part of the motor vehicle, in and/or on the outside of the motor vehicle, in order to avoid manipulation.

23. The apparatus as claimed in claim 1, wherein said apparatus is an entry and/or starting system, of a motor vehicle, at least one of the transceivers of which is arranged as part of the motor vehicle, in and/or on the outside of the motor vehicle, and at least one of the transceivers of which is separate from the motor vehicle and/or is a mobile device or a terminal and/or a radio key, in order to enable a function, such as, opening a door or starting an engine of the motor vehicle, only when at least one transceiver is determined as being within a maximum distance from the motor vehicle.

24. A method, using an apparatus as claimed in claim 1, which determines a propagation delay and/or a distance between a plurality of transceivers, with transceivers outside a motor vehicle and/or transceivers as part of a motor vehicle, wherein transceivers each:
generate codes from at least one starting value using a calculation method known to them, and
transmit one or more messages,
which messages each contain at least one of the codes and/or at least one value respectively formed from one of the codes, wherein at least one propagation delay and/or at least one distance between at least two of the transceivers is/are determined from the propagation delay and/or transmission times and/or reception times of the one or more messages, with filtering of messages to be taken into account for determining a propagation delay and/or distance by comparing one of the codes contained in a message and/or a value respectively formed from one of the codes with at least one code known in a transceiver receiving the message and/or at least one value formed from one of the codes.

\* \* \* \* \*